US011882410B2

(12) United States Patent
Lin

(10) Patent No.: US 11,882,410 B2
(45) Date of Patent: Jan. 23, 2024

(54) HEARING-AID DEVICE

(71) Applicant: Sivantos Pte. Ltd., Singapore (SG)

(72) Inventor: Fenghan Lin, Singapore (SG)

(73) Assignee: Sivantos Ptd. Ltd., Singapore (SG)

( * ) Notice: Subject to any disclaimer, the term of this patent is extended or adjusted under 35 U.S.C. 154(b) by 186 days.

(21) Appl. No.: 17/573,821

(22) Filed: Jan. 12, 2022

(65) Prior Publication Data

US 2022/0225038 A1 Jul. 14, 2022

(30) Foreign Application Priority Data

Jan. 12, 2021 (DE) ..................... 10 2021 200 195.5

(51) Int. Cl.
*H04R 25/00* (2006.01)

(52) U.S. Cl.
CPC ......... *H04R 25/609* (2019.05); *H04R 25/505* (2013.01); *H04R 25/604* (2013.01); *H04R 25/65* (2013.01); *H04R 2225/021* (2013.01); *H04R 2225/51* (2013.01)

(58) Field of Classification Search
CPC .................. H04R 25/554; H04R 25/55; H04R 2225/021; H04R 2225/51; H04R 2225/55; H04R 25/65
See application file for complete search history.

(56) References Cited

U.S. PATENT DOCUMENTS

| | | | |
|---|---|---|---|
| 2009/0169038 A1 | 7/2009 | Knudsen et al. | |
| 2015/0172834 A1 | 6/2015 | Solum | |
| 2017/0171676 A1* | 6/2017 | Pinto | H04R 25/55 |
| 2020/0344561 A1 | 10/2020 | Troelsen et al. | |

FOREIGN PATENT DOCUMENTS

| | | | |
|---|---|---|---|
| EP | 2942979 A1 | 11/2015 | |
| WO | 2015127973 A1 | 9/2015 | |

* cited by examiner

*Primary Examiner* — Amir H Etesam
(74) *Attorney, Agent, or Firm* — Laurence A. Greenberg; Werner H. Stemer; Ralph E. Locher

(57) ABSTRACT

A hearing-aid device, in particular in the form of a conventional hearing aid, includes a signal processing apparatus for processing input signals and for outputting output signals. A loudspeaker unit has a loudspeaker and a conductor connection through which the loudspeaker is electrically conductively connected to the signal processing apparatus. A transmitter and reception unit has a coupling element. A coupling is formed over at least one galvanic isolation point between the coupling element and the conductor connection in such a way that at least a part of the loudspeaker unit is used as antenna structure in transmission and reception operation.

18 Claims, 4 Drawing Sheets

HEARING-AID DEVICE

CROSS-REFERENCE TO RELATED APPLICATION

This application claims the priority, under 35 U.S.C. § 119, of German Patent Application DE 10 2021 200 195.5, filed Jan. 12, 2021; the prior application is herewith incorporated by reference in its entirety.

FIELD AND BACKGROUND OF THE INVENTION

The invention relates to a hearing-aid device and in particular to a hearing-aid device in the form of a conventional hearing aid.

Typically, hearing-aid devices refer to conventional hearing aids which serve for the treatment of the hard of hearing. In a broader sense, that term however also refers to devices formed to assist persons with normal hearing. Hearing-aid devices for assisting persons with normal hearing are also referred to as "personal sound amplification products" or "personal sound amplification devices" (abbreviated as "PSAD"). In contrast to conventional hearing aids, such hearing-aid devices are not provided to compensate for a loss of hearing but are used in targeted fashion to assist and improve the normal human hearing ability in specific hearing situations, for example for assisting with animal observations, in order to be able to better perceive animal sounds and other noises produced by animals, to assist hunters on the hunt, for sports reporters to facilitate improved speech and/or understanding of speech in complex background noise, for musicians to reduce the load on the sense of hearing, etc.

Independently of the intended use, hearing-aid devices usually include at least an input transducer, a signal processing apparatus and an output transducer as necessary components. As a rule, the at least one input transducer is formed by an acoustoelectric transducer in that case, that is to say, for example, by a microphone, or by an electromagnetic reception device, for example an induction coil. Even a plurality of input transducers are installed in many cases, that is to say for example one or more acoustoelectric transducers and an electromagnetic reception device. An electroacoustic transducer is usually used as the output transducer, for example a miniaturized loudspeaker (which is also referred to as a "receiver") or an electromechanical transducer, for example a bone conduction receiver. As a rule, the signal processing apparatus is realized by an electronic circuit provided on a printed circuit board and independently thereof usually has an amplifier.

Moreover, hearing-aid devices are frequently equipped with a transmitter and/or reception unit, which facilitates wireless communication with other electronic devices, in particular with other hearing-aid devices (e.g., for forming a binaural hearing-aid device system or hearing-aid system), with remote controls, with programming devices or with cellular telephones. In that case, the wireless communication is typically implemented by using electromagnetic waves in the radiofrequency range of 500 kHz to 5 GHz, that is to say for example in the frequency range from 1 MHz to 50 MHz or, for example, using Bluetooth technology, at approximately 2.4 GHz.

A problem in the case of hearing-aid devices with such a transmitter and/or reception unit lies in the realization of the antenna required to that end, since conventional antenna structures cannot be readily used due to the free wavelength of more than 10 cm corresponding to the aforementioned frequency range and due to the electrically small volume of conventional hearing-aid devices. That problem is becoming weightier with the advancing miniaturization of hearing-aid devices.

SUMMARY OF THE INVENTION

It is accordingly an object of the invention to provide an advantageously constructed hearing-aid device, which overcomes the hereinafore-mentioned disadvantages of the heretofore-known devices of this general type.

With the foregoing and other objects in view there is provided, in accordance with the invention, a hearing-aid device, in particular in the form of a conventional hearing aid, comprising a signal processing apparatus for processing input signals and for outputting output signals, a loudspeaker unit with a loudspeaker and with a conductor connection, through the use of which the loudspeaker is electrically conductively connected to the signal processing apparatus, a transmitter and reception unit with a coupling element, and a coupling formed over at least one galvanic isolation point between the coupling element and the conductor connection in such a way that at least a part of the loudspeaker unit is used as an antenna structure in transmission and reception operation.

Preferred developments are contained in the dependent claims.

In this context, an appropriate hearing-aid device is typically constructed in the manner of one of the hearing-aid devices described at the outset, and in particular as a conventional hearing aid. Independently thereof, the hearing-aid device includes a signal processing apparatus which is configured to process electrical input signals from an input transducer and to output electrical output signals. In this context, an amplifier or an amplifier function then is typically realized with the signal processing apparatus. Further, the hearing-aid device includes a loudspeaker unit with a loudspeaker as an output transducer and with a conductor connection, through the use of which the loudspeaker is electrically conductively connected to the signal processing apparatus for the purposes of transmitting the electrical output signals from the signal processing apparatus to the loudspeaker. In this context, the loudspeaker unit typically is a functional unit, but not necessarily a modular unit. Moreover, the hearing-aid device includes a transmitter and reception unit with a coupling element, in particular for wireless communication as described at the outset with other electronic devices, wherein a coupling is formed over at least one galvanic isolation point, that is to say a galvanic isolation point of the coupling, between the coupling element and the conductor connection.

In this case, the coupling is expediently formed as an inductive and/or as a capacitive coupling. As a consequence of this coupling, electrical energy is transferred over the at least one galvanic isolation point in a transmission and reception operation of the hearing-aid device. Since as a result thereof electrical energy is coupled into the coupling element or the conductor connection depending on the direction of the energy flow, the at least one galvanic isolation point of the coupling is also referred to below as the at least one coupling point. As a result of the coupling, at least a part of the loudspeaker unit is then used as an antenna structure in the transmission and reception operation of the hearing-aid device.

Not only is no galvanic connection typically formed at the at least one galvanic isolation point of the coupling, but no galvanic connection is formed anywhere between the coupling element and the conductor connection. Independently thereof, the at least one galvanic isolation point of the coupling is usually not formed over the entire extent of the coupling element and/or the entire extent of the conductor connection, but preferably in a restricted spatial region. The coupling is effective or at least significantly effective, at least during the transmission and reception operation, only in this spatial region, which is also referred to as the coupling spatial region. Expediently, this spatial region is structurally specified by the construction of the coupling, that is to say in particular also by virtue of whether the coupling is constructed as an inductive and/or capacitive coupling.

As a result of the coupling thus constructed, at least a part of the loudspeaker unit is used as an antenna structure during the transmission and reception operation. In this case, the antenna structure, that is to say in particular at least a part of the conductor connection and/or at least a part of the loudspeaker, then forms for example an antenna fed by the coupling element. Alternatively, the antenna structure complements the coupling element and forms for example a type of passive antenna structure. That is to say, the antenna structure, i.e., in particular at least a part of the conductor connection and/or at least a part of the loudspeaker, acts as an effective antenna of the hearing-aid device or at least as part of an effective antenna of the hearing-aid device, at least in the transmission and reception operation. This antenna then complements the transmission and reception unit in such a way that a wireless communication, as described at the outset, with other electronic devices is possible. In this case, electromagnetic waves are emitted in the transmission operation by the antenna structure, that is to say in particular by the at least one part of the conductor connection and/or by the at least one part of the loudspeaker, and in some cases moreover also by the coupling element, and electromagnetic waves are received in the reception operation.

Further, the transmission and reception unit is usually configured to generate antenna signals and feed the antenna therewith during transmission operation. Moreover, the transmission and reception unit is expediently configured to process antenna signals which are transferred from the antenna to the transmission and reception unit during reception operation. To this end, the transmission and reception unit for example includes a so-called RF (radiofrequency) chip, that is to say an RFIC (radiofrequency integrated circuit) element. Then, wireless communication is typically effected by using electromagnetic waves in the radiofrequency range of 500 kHz to 5 GHz and in particular in the frequency range from 500 MHz to 5 GHz, that is to say for example using Bluetooth technology at approximately 2.4 GHz.

Depending on the application, the coupling is further constructed as a direct or as an indirect coupling, with the coupling element being directly coupled to the conductor connection in the case of direct coupling and the coupling element being indirectly coupled to the conductor connection through a bridge element in the case of indirect coupling. This bridge element expediently is an additional component or an additional assembly.

Particularly if an aforementioned bridge element is provided, an expedient configuration furthermore has at least two galvanic isolation points of the coupling or two coupling points formed between the coupling element and the conductor connection, these galvanic isolation points or coupling points preferably being spatially separated from one another and in particular connected in series as it were. In these cases, the coupling between the coupling element and the conductor connection is then typically composed of two partial couplings, specifically a first partial coupling over one of the at least two galvanic isolation points of the coupling and a second partial coupling over the other of the at least two galvanic isolation points of the coupling. Depending on the configuration variant, the first coupling then is formed for example as an inductive or at least predominantly inductive coupling and the second partial coupling is formed as a capacitive or predominantly capacitive coupling, in such a way that then in total the coupling between the coupling element and the conductor connection is both inductive and capacitive.

In embodiment variants of the hearing-aid device with a bridge element, the bridge element has a first bridge part and a second bridge part in some cases. Then, the at least one galvanic isolation point of the coupling is formed for example between the first bridge part and the second bridge part. That is to say that a capacitor with two connection arms is disposed between the coupling element and the conductor connection for example, one of these two connection arms being electrically conductively connected to the coupling element and the other of the two connection arms being electrically conductively connected to the conductor connection. Depending on the embodiment variant, an appropriate capacitor is formed by a so-called SMD (surface-mounted device) component in this case.

In embodiments of the hearing-aid device with a bridge element, an advantageous configuration is also one where the coupling element and/or the connector connection is galvanically connected to the bridge element, to be precise in such a way that the bridge element is formed as a type of branch in particular, which branches from the coupling element or the conductor connection. Depending on the embodiment variant, a corresponding galvanic connection between the coupling element and the bridge element or between the conductor connection and the bridge element has at least one resistor and/or a soldered connection, welded connection, adhesive connection or crimped connection.

Furthermore, embodiments in which the bridge element is formed on a printed circuit board, in particular a flexible printed circuit board, and for example has a number of conductor tracks formed on a printed circuit board, are advantageous.

Independently of whether or not the hearing-aid device has an above-described bridge element, it is moreover advantageous if the at least one galvanic isolation point of the coupling is formed on a printed circuit board, that is to say for example on the aforementioned printed circuit board. Such an embodiment of the at least one galvanic isolation point of the coupling on a printed circuit board is particularly advantageous if the at least one galvanic isolation point of the coupling is formed by two capacitively or at least predominantly capacitively coupled electrode elements. In this case, the relative arrangement and relative alignment of the electrode elements required for the capacitive coupling can be realized particularly easily.

An embodiment of the at least one galvanic isolation point of the coupling by way of two capacitively coupled electrode elements may however alternatively also be realized without a printed circuit board. In such a case, wire elements for example form the electronic elements. In order to realize a desired relative arrangement and relative alignment with respect to one another, at least one of the two wire elements then preferably is enveloped by an insulation for example, for example by enamel, and the wire elements are then preferably interconnected, that is to say in particular in integral fashion, through this insulation or the insulations of the wire elements.

Independently thereof it is expedient if at least one aforementioned partial coupling or the coupling over the at least one galvanic isolation point is formed as a capacitive or at least predominantly capacitive coupling. By way of example, such a partial coupling or coupling is then realized by using a capacitor. Depending on the embodiment variant, such a capacitor is disposed between for example the coupling element and conductor connection, between the bridge element and coupling element, between the bridge element and conductor connection or between the first bridge part and second bridge part, with the capacitor in particular having or forming the at least one galvanic isolation point of the coupling. Depending on the embodiment variant, an appropriate capacitor is formed in this context by an aforementioned SMD component. Alternatively, such a capacitive or at least predominantly capacitive partial coupling or coupling is formed by using two of the aforementioned electrode elements.

It is likewise expedient if at least one aforementioned partial coupling or the coupling is formed over the at least one galvanic isolation point as an inductive or at least predominantly inductive coupling. By way of example, such a partial coupling or coupling is then realized by using two coupled conductor loops. In this case, an appropriate conductor loop preferably extends over an angle greater than or equal to 180°.

If now an aforementioned partial coupling or the coupling is formed over the at least one galvanic isolation point as a capacitive or at least predominantly capacitive coupling and if such a capacitive or at least predominantly capacitive partial coupling or coupling is formed by using two aforementioned electrode elements, these electrode elements are typically disposed parallel to one another. In this case, the electrode elements preferably each have a length L greater than or equal to 2 mm, further preferably greater than or equal to 5 mm and in particular greater than or equal to 10 mm. If the electronics elements are formed by wire elements or conductor tracks in this case, the sections of the wire elements or the sections of the conductor tracks which are disposed parallel or at least substantially parallel to one another have the aforementioned length L.

In an advantageous development, the aforementioned electrode elements or the aforementioned sections of the wire elements or the conductor tracks, which are disposed in parallel in particular, are disposed at a distance A from one another which is less than or equal to 5 mm, further preferably less than or equal to 2 mm, in particular less than or equal to 0.5 mm. Moreover, in the case of a distance of A=x, the length L preferably ranges between 0.25x and 0.55x and, in particular, between 0.35x and 0.45x, that is to say at 0.4x, for example.

Further, the above-described concept of the coupling between the coupling element and conductor connection is particularly advantageous in the case of so-called BTE (behind the ear) hearing-aid devices and therefore the hearing-aid device according to the invention preferably is constructed as such a BTE hearing-aid device. A corresponding hearing-aid device then typically has a main housing or BTE housing, which is constructed to be worn behind an ear of a user and in which the signal processing apparatus, the loudspeaker with the conductor connection, and the transmission and reception unit with the coupling element, are positioned.

Other features which are considered as characteristic for the invention are set forth in the appended claims.

Although the invention is illustrated and described herein as embodied in a hearing-aid device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
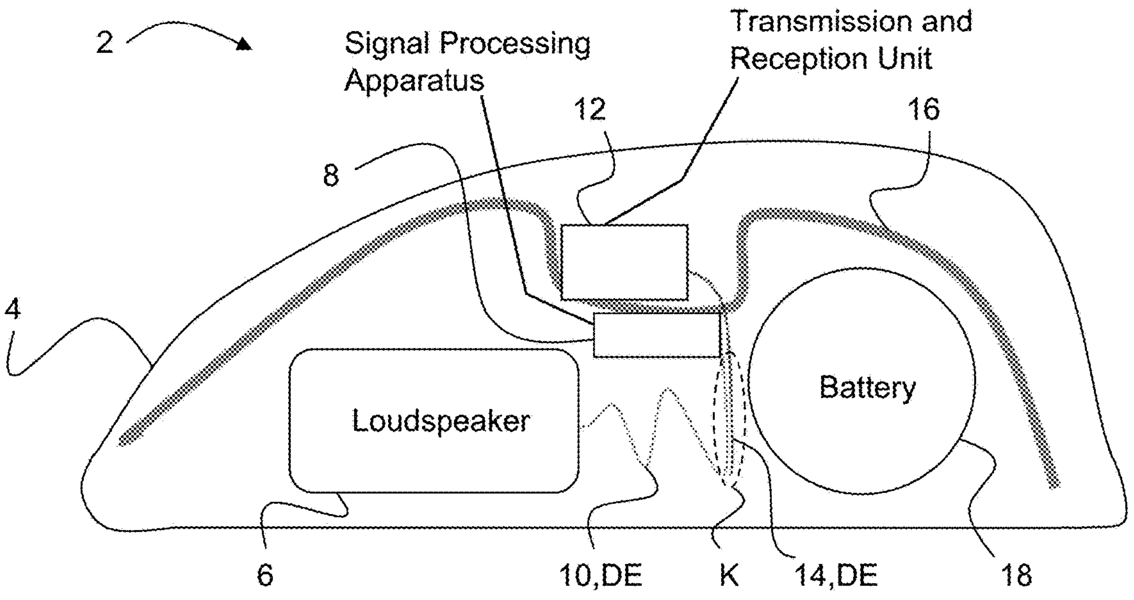
FIG. 1 is a diagrammatic plan view of a first embodiment of an assembly of a hearing-aid device including a coupling element and including a connection conductor which is coupled through a coupling to the coupling element and which serves to connect a loudspeaker and a signal processing unit.

Referring now in detail to the figures of the drawings, in which parts that correspond to one another have been provided with the same reference signs, and first, particularly, to FIG. 1 thereof, there is seen a hearing-aid device 2 which is described below in exemplary fashion, is configured as a so-called BTE hearing-aid device and is preferably in the form of a conventional hearing aid. In this context, the hearing-aid device 2 includes a BTE housing 4, which is configured to be worn behind an ear of a user. At least a microphone, not illustrated explicitly, for generating electrical input signals on the basis of captured acoustic input signals, and a loudspeaker 6 for generating acoustic output signals, are disposed in this BTE housing 4.

Further, a signal processing apparatus 8 for processing the electrical input signals is positioned in the BTE housing 4. In this case, the signal processing apparatus 8 is electrically conductively connected to the loudspeaker 6 through a conductor connection 10 and the signal processing apparatus 8 is configured to process the electrical input signals from the at least one microphone and to generate electrical output signals on the basis of the electrical input signals. These electrical output signals are then supplied to the loudspeaker 6 through the conductor connection 10 and are converted into the acoustic output signals at the loudspeaker. In this context, the loudspeaker 6 and the conductor connection 10 are part of a loudspeaker unit. Then, the hearing-aid device 2 and in particular the signal processing apparatus 8 are furthermore configured so that a type of amplifier function is realized during the operation, through the use of which the acoustic input signals or at least parts of the acoustic input signals are amplified and output as the acoustic output signals.

Moreover, the hearing-aid device 2 includes a transmission and reception unit 12 with a coupling element 14, which is likewise disposed in the BTE housing 4. In this case, the transmission and reception unit 12 serves for wireless communication with other electronic devices, in particular with other hearing-aid devices (e.g., for forming a binaural hearing-aid device system or hearing-aid system), with remote controls, with programming devices or with cellular telephones. In this case, the wireless communication is typically implemented by using electromagnetic waves in the radiofrequency range of 500 kHz to 5 GHz and in particular in the frequency range from 500 MHz to 5 GHz, that is to say for example using Bluetooth technology at approximately 2.4 GHz.

The aforementioned conductor connection 10 to the loudspeaker 6 and the aforementioned coupling element 14 of the transmission and reception unit 12 further are part of an assembly which is schematically reproduced in various embodiment variants in the illustrations of FIG. 1 to FIG. 10. In this case, in all embodiment variants, a coupling is formed between the coupling element 14 and the conductor connection 10, that coupling facilitating a transfer of electrical energy or electrical power, and the latter also being implemented in transmission and reception operation of the transmitter and reception unit 12. In this case, the coupling is formed as an inductive and/or capacitive coupling, by way of which the coupling element 14 and the conductor connection 10 are coupled over at least one galvanic isolation point.

A first embodiment variant of the aforementioned assembly is illustrated in FIG. 1. In this case, the signal processing apparatus 8 is formed in a manner not illustrated in any more detail on a printed circuit board 16, in particular a flexible printed circuit board 16, and the conductor connection 10 to the loudspeaker 6 is formed at least in part, that is to say in one section in particular, by a wire element DE, which is referred to as connection wire below. This connection wire electrically conductively connects the printed circuit board 16 to the loudspeaker 6 in this case. Moreover, the coupling element 14 of this embodiment variant is formed at least in part, that is to say in one section in particular, by a wire element DE which is referred to as coupling wire below.

In this case, the coupling wire is guided for example in an interstice between the loudspeaker 6 and a battery 18 or a rechargeable battery of the hearing-aid device 2 and extends away from the transmitter and reception unit 12 which is seated on the printed circuit board 16. In the intermediate region between the loudspeaker 6 and the battery 18 or the rechargeable battery, a section of the connection wire and a section of the coupling wire now run substantially parallel to one another and, as a result thereof, a capacitive or at least predominantly capacitive coupling is formed over these wire sections of the wire elements DE. The corresponding region, specifically a coupling spatial region K, in which this coupling is provided, is marked by a frame with a dashed line.

Preferably, the sections in which the wire elements DE run in parallel have at least a length L that is greater than or equal to 2 mm, further preferably greater than or equal to 5 mm and in particular greater than or equal to 10 mm. Moreover preferably, these sections are disposed at a distance A from one another which is less than or equal to 5 mm, further preferably less than or equal to 2 mm and in particular less than or equal to 0.5 mm.

According to an advantageous development, the two wire elements DE, that is to say firstly the coupling wire and secondly the connection wire, are formed by enameled wires which are preferably interconnected and for example adhesively bonded to one another over the sections running in parallel, in such a way that this fixes the specified parallel extent and the specified distance.

Figure 2:
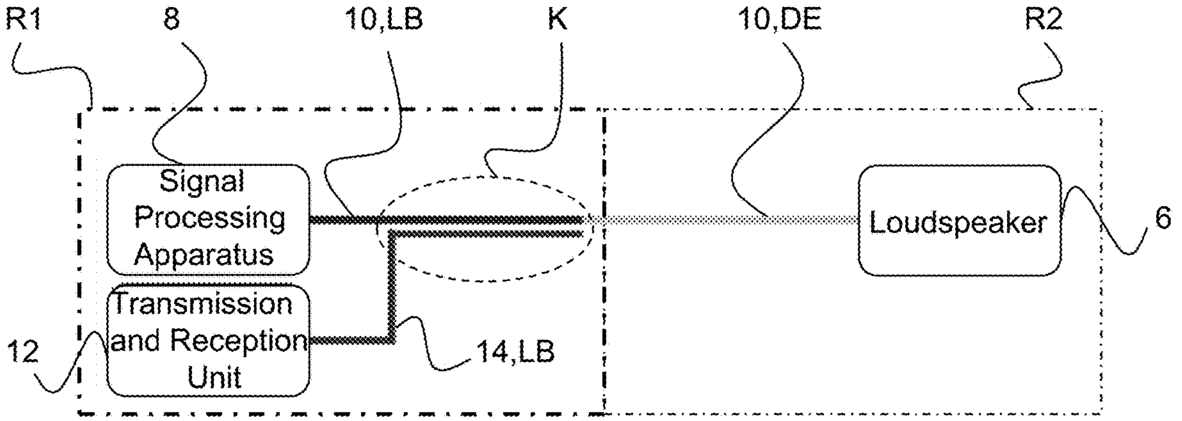
FIG. 2 is a plan view of a second embodiment of the assembly of the hearing-aid device.
Figure 3:
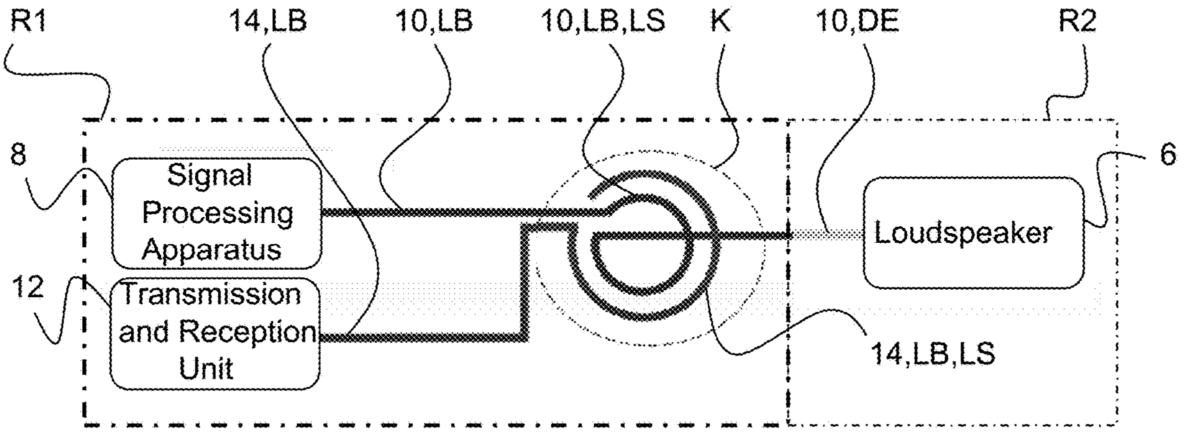
FIG. 3 is a plan view of a third embodiment of the assembly of the hearing-aid device.

Two further embodiment variants of the aforementioned assembly are indicated in FIG. 2 and FIG. 3. Here, in each case, a first frame R1 shown on the left-hand side using a bold dash-dotted line indicates elements of the hearing-aid device 2 that are realized on the printed circuit board 16, and a second frame R2 shown on the right-hand side using a dash-dotted line not in bold indicates elements of the hearing-aid device 2 which are realized away from the printed circuit board 16.

In the embodiment variant according to FIG. 2, the coupling element 14 is formed in full on the printed circuit board 16, to be precise by a conductor track LB on the printed circuit board 16, which is also referred to as a coupling track below. By contrast, the conductor connection 10 is partly formed on the printed circuit board 16 and partly formed by a wire element DE which connects the printed circuit board 16 to the loudspeaker 6. The part of the conductor connection 10 formed on the printed circuit board 16 is formed by a conductor track LB, which is also referred to as connection track below. Now, in this embodiment variant, the coupling between the conductor connection 10 and the coupling element 14 is realized in a region on the printed circuit board 16 where the connection track and the coupling track extend in parallel in at least one section. The corresponding region, specifically the coupling spatial region K, in which this coupling is provided, is once again marked by a frame with a dashed line.

In this case too, the sections in which the conductor tracks LB extend in parallel have at least a length L of greater than or equal to 2 mm, further preferably greater than or equal to 5 mm and in particular greater than or equal to 10 mm. Moreover preferably, these sections are disposed at a distance A from one another which is less than or equal to 5 mm, further preferably less than or equal to 2 mm and in particular less than or equal to 0.5 mm.

FIG. 3 illustrates a modification of the embodiment variant according to FIG. 2. In this case, the coupling is not embodied as a capacitive or predominantly capacitive coupling but as an inductive or at least predominantly inductive coupling. To this end, the coupling track and the conductor track each form a conductor loop LS. The corresponding region, specifically the coupling spatial region K, in which this coupling is provided, is also marked by a frame with a dashed line herein. Alternatively, a comparable inductive or at least predominantly inductive coupling can also be realized away from the printed circuit board 16, in a manner analogous to the capacitive or at least predominantly capacitive coupling according to FIG. 1. In this example, wire elements DE for example form the conductor loops LS.

Independently of the precise configuration of the coupling, the coupling element 14 and the conductor connection 10 are coupled over at least one galvanic isolation point. In this case, further, not only is no galvanic connection formed at the at least one galvanic isolation point of the coupling, but no galvanic connection is formed anywhere between the coupling element 14 and the conductor connection 10. Nevertheless, the at least one galvanic isolation point of the coupling is usually not formed over the entire extent of the coupling element 14 and/or the entire extent of the conductor connection 10, but in a restricted spatial region. It is only in this spatial region, specifically the aforementioned coupling spatial region K, that the coupling is effective or at least significantly effective at least in the transmission and reception operation. Expediently, this spatial region is structurally specified by the construction of the coupling, that is to say in particular also by virtue of whether the coupling is formed as an inductive and/or as a capacitive coupling.

Figure 4:
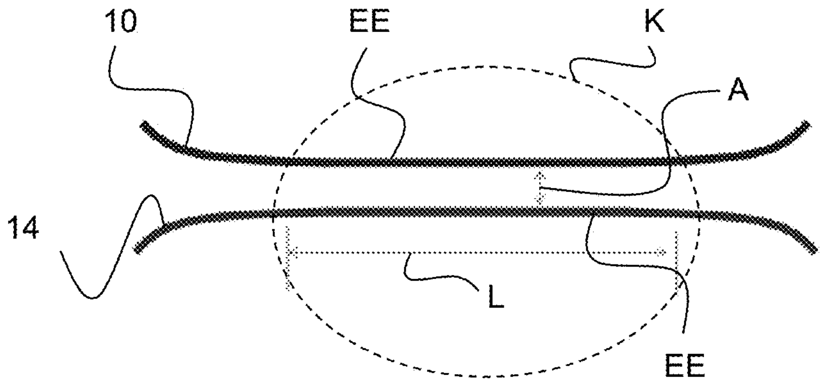
FIG. 4 is a plan view of a fourth embodiment of the assembly of the hearing-aid device.
Figure 5:
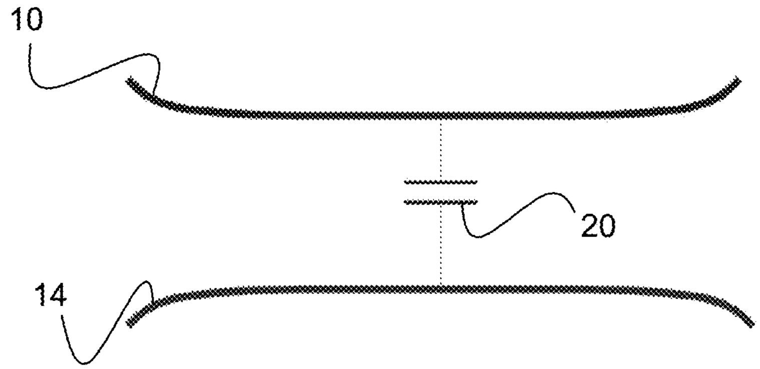
FIG. 5 is a plan view of a fifth embodiment of the assembly of the hearing-aid device.

In order to clarify these circumstances, FIG. 4 shows a capacitive or at least predominantly capacitive coupling. In this case, the coupling element 14 and the conductor connection 10 each form an electrode element EE, with the electrode elements EE being disposed substantially parallel to one another. In this context, the sections of the coupling element 14 and the conductor connection 10 which extend substantially parallel to one another and in which the coupling is effective, that is to say the sections in the marked coupling spatial region K, are understood to be electrode elements EE. Preferably, these sections, which for example are formed by the above-described wire elements DE according to FIG. 1 or the above-described conductor tracks LB according to FIG. 2, have at least a length L of greater than or equal to 2 mm, further preferably greater than or equal to 5 mm and in particular greater than or equal to 10 mm. Moreover preferably, these sections are disposed at a distance A from one another which is less than or equal to 5 mm, further preferably less than or equal to 2 mm and in particular less than or equal to 0.5 mm.

A spatially close arrangement of the electrode elements EE is typical in the case of the above-described coupling by using electrode elements EE. That is to say, the coupling element 14 and the conductor connection 10 in this case are disposed in relation to one another at least in one section at a distance A that is made concrete in advance. Particularly in cases where such a spatial proximity is not realizable and/or not desirable, embodiment variants in which a capacitor 20 is disposed between the coupling element 14 and the conductor connection 10 are expedient, like in the exemplary embodiment according to FIG. 5, and/or in which a bridge element 22 is disposed between the coupling element 14 and the conductor connection 10, like in the exemplary embodiments according to FIG. 6 to FIG. 10.

In the exemplary embodiments according to FIG. 6 to FIG. 10, the coupling is formed as an indirect coupling, wherein the coupling element 14 is coupled indirectly to the conductor connection 10 through the bridge element 22. This bridge element 22 expediently is an additional component or an additional assembly.

Depending on the application, embodiments of the hearing-aid device 2 with a bridge element 22 in which the coupling element 14 and/or the conductor connection 10 is galvanically connected to the bridge element 22, specifically in particular in such a way that the bridge element 22 is formed as a type of branch which branches from the coupling element 14 or from the conductor connection 10, are advantageous. A corresponding galvanic connection between the coupling element 14 and the bridge element 22 or between the conductor connection 10 and the bridge element 22 has, depending on the embodiment variant, at least one resistor and/or a solder connection, a welded connection, an adhesive connection or a crimped connection.

Figure 6:
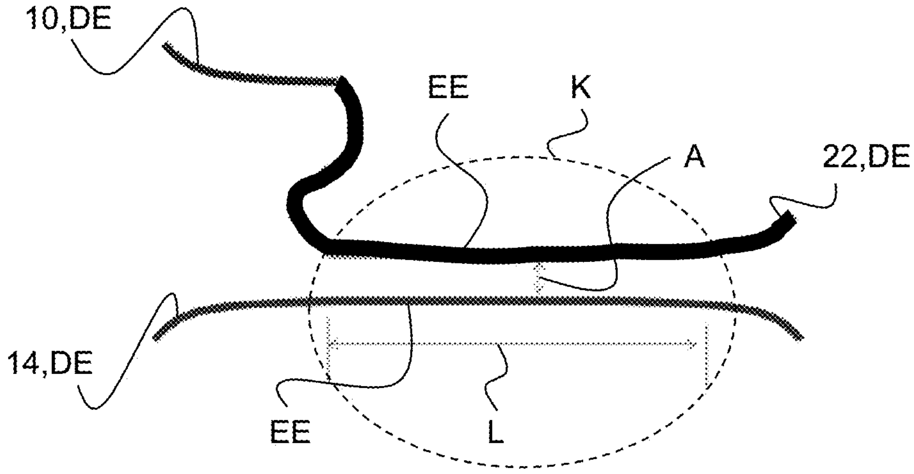
FIG. 6 is a plan view of a sixth embodiment of the assembly of the hearing-aid device.

Now, such a galvanic connection is formed between the conductor connection 10 and the bridge element 22 in the exemplary embodiment according to FIG. 6. In this case, the bridge element 22 is identifiable as an additional component or an additional assembly, for example by virtue of the conductor connection 10 being formed by a conductor track LB and the bridge element 22 being formed by a wire element DE, or for example by virtue of the conductor connection 10 and the bridge element 22 being formed by different wire elements DE. Moreover, a coupling by using the above-described electrode elements EE is formed between the bridge element 22 and the coupling element 14.

In an alternative embodiment variant which is not shown, the roles of the coupling element 14 and the conductor connector 10 are interchanged as it were. Then, in that case, such a galvanic connection is formed between the coupling element 14 and the bridge element 22 and a coupling by using the above-described electrode elements EE is formed between the bridge element 22 and the conductor connection 10.

Furthermore, configurations are advantageous in which at least two galvanic isolation points of the coupling or two coupling points are formed between the coupling element 14 and the conductor connection 10, those galvanic isolation points or coupling points being spatially separated from one another by the bridge element 22 and being connected in series as it were. The coupling between the coupling element 14 and the conductor connection 10 in these cases is formed of two partial couplings, specifically a first partial coupling over one of the at least two galvanic isolation points of the coupling and a second partial coupling over the other of the at least two galvanic isolation points of the coupling.

Figure 7:
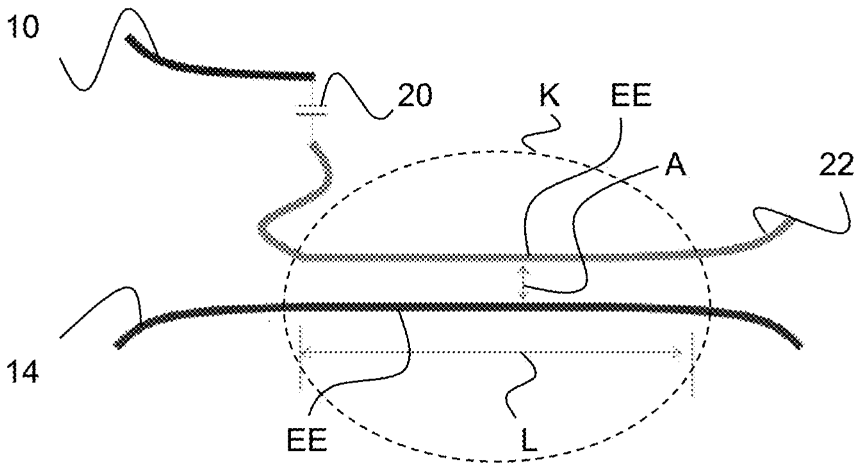
FIG. 7 is a plan view of a seventh embodiment of the assembly of the hearing-aid device.
Figure 8:
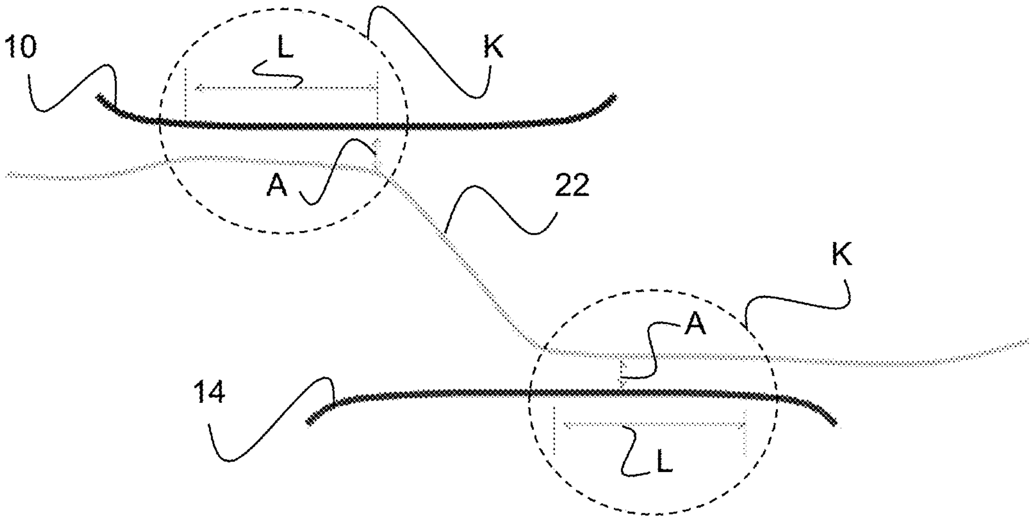
FIG. 8 is a plan view of an eighth embodiment of the assembly of the hearing-aid device.

FIG. 7 shows such a coupling through two coupling points. The first coupling point and the first partial coupling are formed in this case between the conductor connection 10 and the bridge element 22, and the second coupling point and the second partial coupling are formed between the coupling element 14 and the bridge element 22. In the exemplary embodiment according to FIG. 7, the first partial coupling is formed by using a capacitor 20 and the second partial coupling is formed by using the above-described electrode elements EE.

In an alternative embodiment variant which is not shown, the roles of the coupling element 14 and the conductor connection 10 are once again interchanged as it were. In accordance with a further embodiment variant, which is not shown, the two partial couplings are each formed by using a capacitor 20 and, in the embodiment variant according to FIG. 8, both partial couplings are each formed by using the above-described electrode elements EE.

In accordance with further embodiment variants, which are not shown, one of the two partial couplings is formed as an inductive or at least predominantly inductive coupling and the other partial coupling is formed as a capacitive or predominantly capacitive coupling in such a way that then, overall, the coupling between the coupling element 14 and the conductor connection 10 is both inductive and capacitive. In this case, the partial couplings are constructed in the manner of the above-described partial couplings or the above-described couplings.

Figure 9:
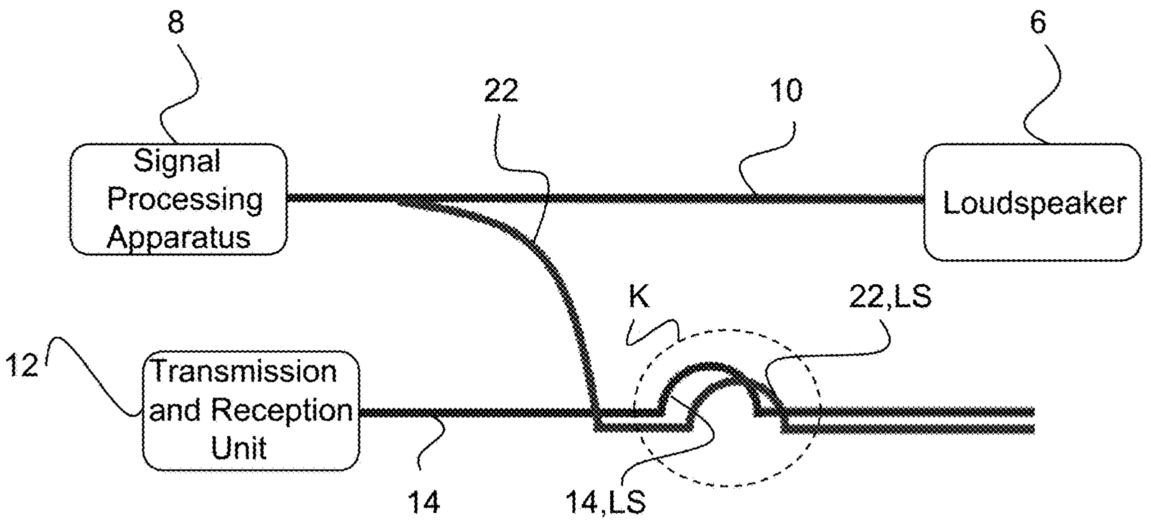
FIG. 9 is a plan view of a ninth embodiment of the assembly of the hearing-aid device.

In FIG. 9, the coupling between the bridge element 22 and the coupling element 14 is formed as an inductive or at least predominantly inductive coupling. A galvanic connection configured as a branch is moreover formed between the conductor connection 10 and the bridge element 22.

Figure 10:
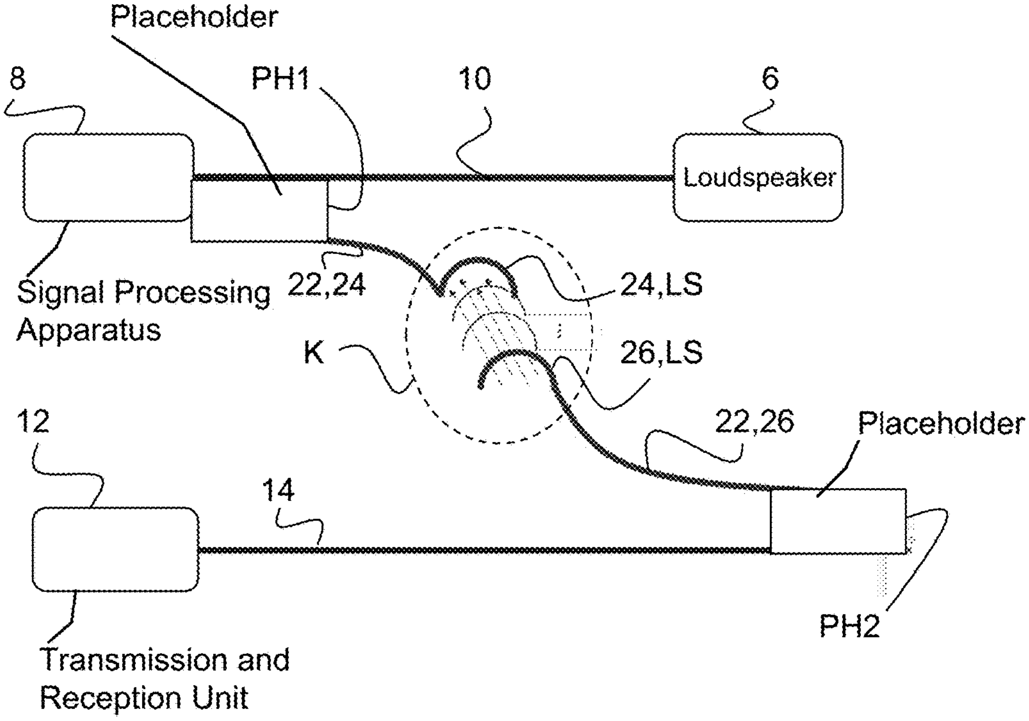
FIG. 10 is a plan view of a tenth embodiment of the assembly of the hearing-aid device.

Further, embodiments in which the bridge element 22 has a first bridge part 24 and a second bridge part 26, as indicated in FIG. 10, are expedient. In that case, then, the at least one galvanic isolation point of the coupling in particular is formed between the first bridge part 24 and the second bridge part 26. In FIG. 10, the first bridge part 24 and the second bridge part 26 are inductively or at least predominantly inductively coupled in exemplary fashion.

The frames with the solid line between the conductor connection 10 and the first bridge part 24 and between the second bridge part 26 and the coupling element 14, shown in FIG. 10, represent placeholders PH1, PH2. Each placeholder PH1, PH2 represents a partial coupling according to an above-described type or a galvanic connection of an above-described type in any combination. Hence, for example, a galvanic connection formed as a branch and/or formed by way of a resistor then is formed between the conductor connection 10 and the first bridge part 24 and a capacitive or predominantly capacitive coupling by using the aforementioned electrode elements EE is formed between the second bridge part 26 and the coupling element 14.

The following is a summary list of reference numerals and the corresponding structure used in the above description of the invention.

LIST OF REFERENCE SIGNS

2 Hearing-aid device
4 BTE housing
6 Loudspeaker
8 Signal processing apparatus
10 Conductor connection
12 Transmitter and reception unit
14 Coupling element
16 Printed circuit board
18 Battery
20 Capacitor
22 Bridge element
24 First bridge part
26 Second bridge part
DE Wire element
LB Conductor track
LS Conductor loop
EE Electrode element
K Coupling spatial region
R1 First frame
R2 Second frame
L Length
A Distance
PH1 Placeholder 1
PH2 Placeholder 2

The invention claimed is:

1. A hearing-aid device or conventional hearing aid, comprising:
- a signal processing apparatus for processing input signals and for outputting output signals;
- a loudspeaker unit having a loudspeaker and a conductor connection electrically conductively connecting said loudspeaker to said signal processing apparatus;
- a transmitter and reception unit having a coupling element;
- at least one galvanic isolation point between said coupling element and said conductor connection; and
- a coupling formed over said at least one galvanic isolation point and causing at least a part of said loudspeaker unit to act as an antenna structure in transmission and reception operation.

2. The hearing-aid device according to claim 1, wherein said coupling element is directly coupled to said conductor connection.

3. The hearing-aid device according to claim 1, which further comprises a bridge element indirectly coupling said coupling element to said conductor connection.

4. The hearing-aid device according to claim 3, wherein said at least one galvanic isolation point includes at least two galvanic isolation points formed between said coupling element and said conductor connection, said at least two galvanic isolation points being spatially separated from one another and connected in series.

5. The hearing-aid device according to claim 3, wherein said bridge element has a first bridge part and a second bridge part, and said at least one galvanic isolation point is formed between said first bridge part and said second bridge part.

6. The hearing-aid device according to claim 3, wherein at least one of said coupling element or said conductor connection is galvanically connected to said bridge element.

7. The hearing-aid device according to claim 6, wherein said bridge element is formed as a branch.

8. The hearing-aid device according to claim 3, which further comprises a printed circuit board, said bridge element being formed on said printed circuit board.

9. The hearing-aid device according to claim 1, which further comprises a capacitor forming said at least one galvanic isolation point.

10. The hearing-aid device according to claim 1, which further comprises two coupled conductor loops forming said at least one galvanic isolation point.

11. The hearing-aid device according to claim 1, which further comprises a printed circuit board, said at least one galvanic isolation point being formed on said printed circuit board.

12. The hearing-aid device according to claim 1, which further comprises two capacitively coupled electrode elements forming said at least one galvanic isolation point.

13. The hearing-aid device according to claim 12, wherein said two capacitively coupled electrode elements are formed by wire elements.

14. The hearing-aid device according to claim 12, wherein said two electrode elements are disposed parallel to one another and each have a length greater than or equal to 2 mm.

15. The hearing-aid device according to claim 12, wherein said two electrode elements are disposed parallel to one another and each have a length greater than or equal to 10 mm.

16. The hearing-aid device according to claim 12, wherein said two electrode elements are disposed parallel to one another and run parallel to one another at a distance of less than or equal to 5 mm.

17. The hearing-aid device according to claim 12, wherein said two electrode elements are disposed parallel to one another and run parallel to one another at a distance of less than or equal to 0.5 mm.

18. The hearing-aid device according to claim 1, wherein the hearing-aid device is a BTE hearing-aid device including a BTE housing, and said signal processing apparatus, said loudspeaker unit with said loudspeaker and said conductor connection, and said transmitter and reception unit with said coupling element, are positioned in said BTE housing.

* * * * *